United States Patent [19]
Nemoto et al.

[11] Patent Number: 4,955,951
[45] Date of Patent: Sep. 11, 1990

[54] BORING APPARATUS

[75] Inventors: Isao Nemoto, Narashino; Yuji Yamaoka, Machida, both of Japan

[73] Assignees: Kabushiki Kaisha Iseki Kaihatsu Koki, Tokyo; Nemoto Kikaku Kogyo Kabushiki Kaisha, Yachiyo, both of Japan

[21] Appl. No.: 316,298

[22] Filed: Feb. 27, 1989

[30] Foreign Application Priority Data

Mar. 1, 1988 [JP] Japan .................................. 63-45724

[51] Int. Cl.⁵ .............................................. E03F 3/00
[52] U.S. Cl. .................................... 166/55.7; 409/143
[58] Field of Search ...................... 166/55, 55.7, 55.8; 175/24, 26, 258; 409/143, 179

[56] References Cited

U.S. PATENT DOCUMENTS

| | | | |
|---|---|---|---|
| 4,197,908 | 4/1980 | Davis et al. | 409/143 X |
| 4,442,891 | 4/1984 | Wood | 166/55.8 X |
| 4,577,388 | 3/1986 | Wood | 409/143 X |
| 4,648,454 | 3/1987 | Yarnell | 166/55.7 X |
| 4,785,512 | 11/1988 | Sigel | 409/143 X |
| 4,819,721 | 4/1989 | Long, Jr. | 409/143 X |

Primary Examiner—William P. Neuder
Attorney, Agent, or Firm—Mattern, Ware, Stoltz & Fressola

[57] ABSTRACT

An apparatus for boring a hole, which affords communication between a first member and a second member connected to the first member, in the first member, comprises cutting means hvaing a rotary axis, first drive means for shifting the cutting means along a first axis extending in the direction orghogonal to the rotary axis, second drive means for shifting the cutting means along a second axis orghogonal to the rotary axis and first axis, third drive means for rotating the cutting means about the rotary axis, detecting means for detecting a load acting on the cutting means and control means for controlling the first and second drive means to correct the position of the cutting means on the basis of a detecting signal provided from the detecting means so as to prevent an overload from acting on the cutting means.

19 Claims, 3 Drawing Sheets

BORING APPARATUS

BACKGROUND OF THE INVENTION

1. Field of the Invention:

This invention relates to an apparatus for boring a hole affording communication between a first member such as a tubular member and a plate-like member and a second tubular or annular member connected to the first member and, more particularly, to an apparatus for boring a hole, which affords communication between a first pipe like a main pipe of sewerage and a second pipe like a mounting pipe or branch pipe connected to the first pipe, from the side of the first pipe.

2. Description of the Prior Art:

Various methods for disposing new pipes in existing pipes such as sewer pipes, water-supply pipes, gas pipes, pipes for power line and pipes for telephone line and for applying coating or lining to the inner surface of an existing pipe have been proposed and executed in order to reproduce the existing pipes. According to these reproducing methods, newly installed pipes are provided in the interior of the existing pipe to be substantially integral therewith. However, since the reproduced pipe in accordance with these methods has a problem that a pipe opening of a branch pipe is closed with the newly installed pipe, it is necessary to bore a hole for opening the pipe opening of a branch communicating to the existing pipe to the interior of the reproduced pipe.

As for one of apparatuses for boring such hole, there has been proposed an apparatus for boring a hole in a newly installed pipe from the interior of a reproduced pipe with a cutter rotated about the axis extending in the radial direction of the pipe to cut away a portion of the pipe (for example, Japanese Utility Model Public Disclosure (KOKAI) No. Sho 61-35370). This boring apparatus bores a hole in the newly installed pipe by rotating the cutter about the axis extending in the radial direction of the reproduced pipe while shifting the cutter outwardly in the radial direction after the boring apparatus is determined in position inside the reproduced pipe so that the cutter is opposed to the pipe opening of the branch pipe.

However, in the prior boring apparatus, use is made of a conical cutter having the maximum diameter larger than that of a hole to be bored and the cutter is maintained in position to be immovable relative to the first pipe during the boring operation. Therefore, the boring apparatus has to be determined in position so that a rotary axis of the cutter coincides with the center of the pipe opening of the branch pipe. Unless the boring apparatus is determined in position in such way, there is a possibility of cutting away the branch pipe portion or a predetermined hole in size cannot be bored.

SUMMARY OF THE INVENTION

An object of the present invention is to provide a boring apparatus capable of boring a predetermined hole in a predetermined position without cutting away a second member portion even if the positional relationship between a rotary axis of cutting means and the center of a portion to be bored a hole is inaccurate.

According to the present invention, there is provided an apparatus for boring in a first member a hole affording communication between the first member and a second member connected to the first member, which comprises cutting means having a rotary axis, first drive means for displacing the cutting means along a first axis extending in the direction orthogonal to the rotary axis, second drive means for displacing the cutting means along a second axis orthogonal to the rotary axis and first axis, third drive means for rotating the cutting means about the rotary axis, detecting means for detecting a load acting on the cutting means and control means for controlling the first and second drive means to correct the position of the cutting means relative to a portion to be bored a hole on the basis of a detecting signal provided from the detecting means so as to prevent an overload from acting on the cutting means.

According to the present invention, there is further provided a boring apparatus for boring a hole affording communication between a first pipe embedded in the ground and a second pipe embedded in the ground so as to be branched from the first pipe, which comprises cutting means having a rotary axis, first drive means for displacing the cutting means along a first axis extending in the direction of the axis of the first pipe and orthogonal to the rotary axis, second drive means for displacing the cutting means along a second axis orthogonal to the first axis, third drive means for rotating the cutting means about the rotary axis, detecting means for detecting a load acting on the cutting means and control means for controlling the first and second drive means to correct the position of the cutting means relative to a portion to be bored a hole on the basis of a detecting signal provided from the detecting means so as to prevent an overload from acting on the cutting means.

When boring is done, the cutting means is rotated about its own rotary axis while it is shifted in two directions orthogonal to the rotary axis by the operation of the first and second drive means. When the cutting means comes into contact with the second member, the cutting means will cut away the first and second member portions, so that a load larger than that acting on the cutting means when cutting away only the first member portion acts on the cutting means. Thus, the cutting means is subjected to correction with respect to the position of the cutting means relative to the first member, and hence correction to the direction of movement of the cutting means so as to prevent an overload from acting on the cutting means, that is, to prevent the cutting means from cutting away the second member portion.

Therefore, according to the present invention, since the cutting means is finally shifted along the second member so long as the cutting means confronts the portion to be bored a hole even if the positional relationship between the rotary axis of the cutting means and the center of the portion to be bored a hole is inaccurate, a predetermined hole may be bored in a predetermined position without largely cutting away the second member portion.

In the case of the apparatus for boring a hole affording communication between the first pipe embedded in the ground and the second pipe embedded in the ground so as to be branched from the first pipe, it is difficult to accurately align the rotary axis of the cutting means with the center of the portion to be bored a hole. However, in this case, the positional relationship between the first and second pipes is constant. Therefore, according to the present invention, the cutting means is finally guided along the inner surface of the second pipe to thereby bore a predetermined hole in a predetermined position of the first pipe even if the positional relationship between the cutting means and the portion to be bored a hole is inaccurate.

BRIEF DESCRIPTION OF THE DRAWINGS

The foregoing and other objects and features of the invention will become apparent from the following description of a preferred embodiment of the invention with reference to the accompanying drawings, in which.

DETAILED DESCRIPTION OF PREFERRED EMBODIMENT

The present invention may be applied, in addition to an apparatus for boring a hole, which affords communication between a first pipe embedded in the ground and a second pipe connected to the first pipe, from the side of the first pipe, to other apparatusses, such as an apparatus for boring a hole affording communication between a plate-like first member and a tubular or annular second member connected to the first member.

Figure 1:
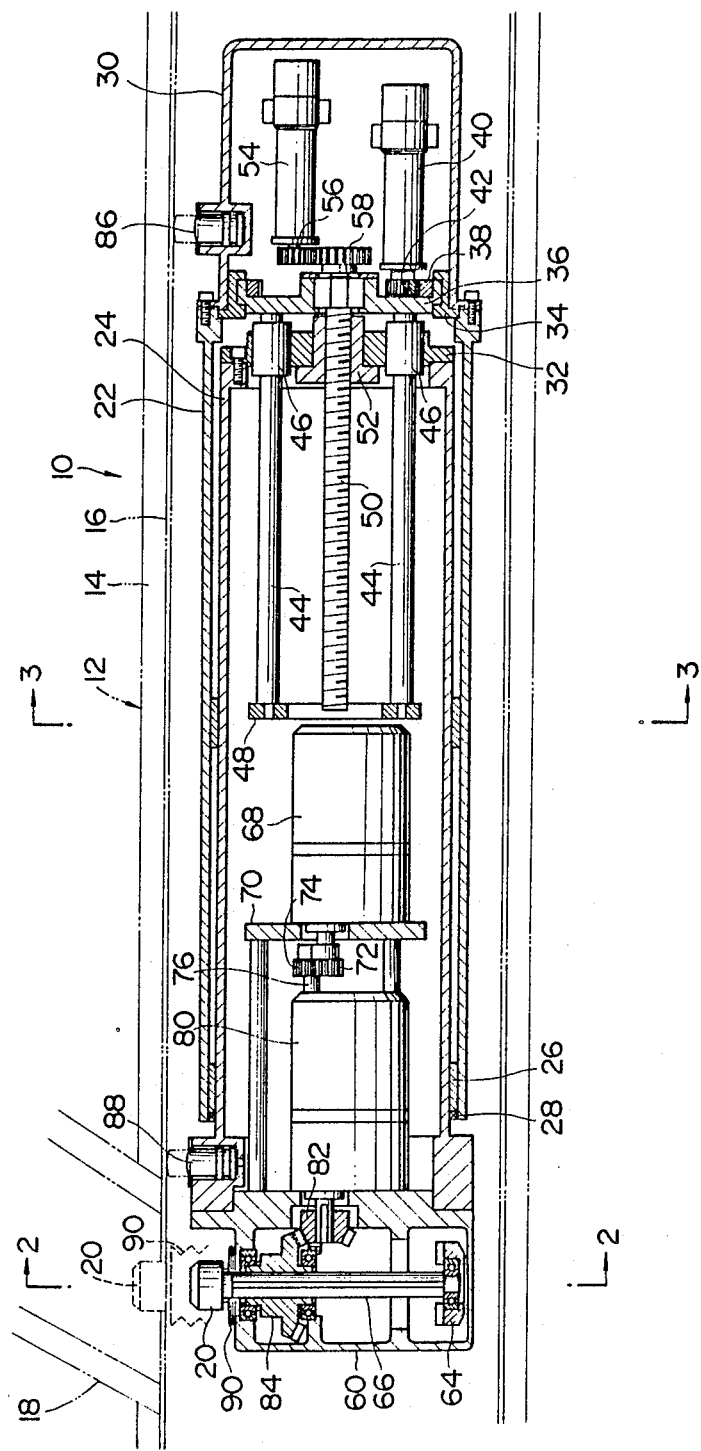
FIG. 1 is a longitudinal cross-sectional view showing an embodiment of a boring apparatus according to the present invention.
Figure 2:
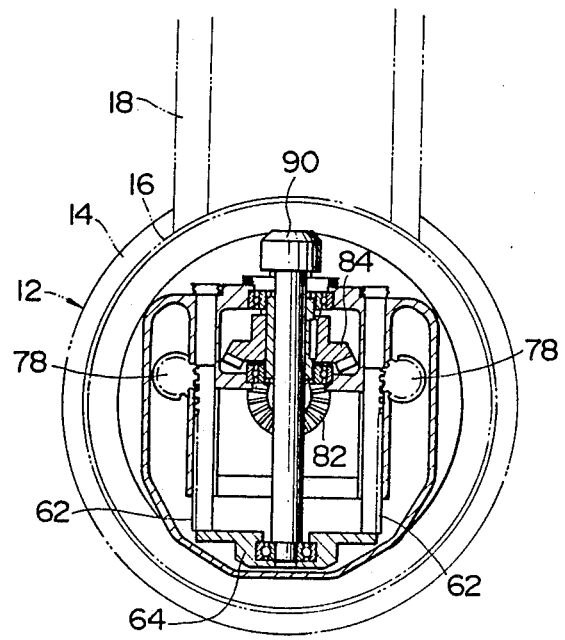
FIG. 2 is a sectional view taken along the line 2—2 in FIG. 1.
Figure 3:
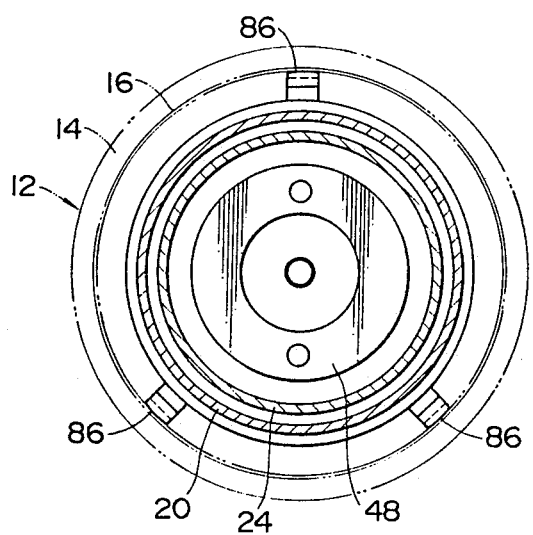
FIG. 3 is a sectional view taken along the line 3—3 in FIG. 1.

A boring apparatus 10 as shown in FIGS. 1 through 3 is disposed to be movable in a first pipe 12 embedded in the ground. In the illustrated embodiment, the first pipe 12 consists of an existing pipe 14 and a pipe 16 made of synthetic resin and disposed inside the existing pipe. The existing pipe 14 and pipe 16 are connected integrally with each other by means of hardenable filler such as cement and adhesive, which fills a space between both of the pipes 14,16.

To the existing pipe 14 is connected a second pipe 18 such as a branch pipe. A pipe opening of the second pipe 18 is, however, closed with the pipe 16 and filler. The boring apparatus 10 is adapted to afford communication between the second pipe 18 and the pipe 16 by cutting away a portion of the pipe 16 and filler corresponding to the pipe opening of the second pipe 18 with a cutter 20.

The boring apparatus 10 comprises a first tubular body 22 and a second body 24 disposed in the first body so as to be coaxial with the first body. Between the first and second bodies 22,24 are disposed a plurality of bearing members 26 for maintaining the second body 24 in the first body 22 so as to be movable in the axial direction of the first body 22 and also rotatable about the axis of the first body and a seal material 28 for maintaining both members 22,24 in the liquid-tight state.

On one end of the first body 22 is removably mounted a cup-like lid 30 by a plurality of fastening means like bolts so as to close one end of the first body 22, whereas a bracket 32 is removably mounted on one end of the second body 24 by a plurality of connecting means like bolts.

An annular guide 34 is fixedly attached to the inside of the lid 30 and supports a disk-like rotor 36 so as to be rotatable about the axis of the first body 22. The rotor 36 is provided with an internal gear 38 which meshes with a gear 42 provided on a rotary shaft of a servo motor 40 mounted on the lid 30. Thus, when the servo motor 40 is rotated, the rotor 36 is rotated about the axis of the first body 22.

A plurality of guide rods 44 extending in parallel to the axis of the first body 22 is fixed in cantilever relation to the rotor 36. Each of the guide rods 44 extends slidably through a corresponding one of bearings 46 mounted on the bracket 32. As a result, when the rotor 36 is rotated, the second body 24 is rotated about the axis of the first body 22. The respective other ends of the guide rods 44 are interconnected through connecting bodies 48 for maintaining these other ends in parallel.

A screw 50 extending along the axis of the first body 22 is supported at its one end by the rotor 36 in cantilever relation thereto. The screw 50 is brought into engagement with a female screw 52 mounted on the bracket 32. The screw 50 is rotated by a servo motor 54 mounted on the lid 30 through a gear 56 provided on the rotary shaft of the servo motor 54 and a gear 58 meshing with the gear 56 and mounted on one end of the screw 50.

In consequence, the second body 24 is shifted in the direction of the axis of the first body 22 through the rotation of the servo motor 54 so that the second body is protruded from the first body 22 in the forward rotation of the servo motor 54 while it is received in the first body 2 in the reverse rotation of the servo motor 54.

A bracket 60 is mounted on the opposite end of the second body 24 to the bracket 32. In the bracket 60 are disposed a pair of rod-like racks 62 extending in parallel to each other so as to be vertically movable. A connecting plate 64 for interconnecting both racks is mounted on the lower ends of both racks 62. The connecting plate 64 rotatably supports a rotary shaft 66 extending in parallel to each rack 62 and in the radial direction of the first body 22 through bearings.

The rotary shaft 66 extends rotatably and slidably through the bracket 60 and further extends above the bracket 60. On the upper end of the rotary shaft 66 is removably mounted the cutter 20.

On the bracket 60 is mounted a frame bed 70 for supporting a servo motor 68. To shafts 76 each having a gear 74 is transmitted the rotation of the servo motor 68 through a gear 72 mounted on the rotary shaft of the servo motor and the gears 74 meshing with the gear 72. Each of the shafts 76 is rotatably supported by the bracket 60 so as to extend in parallel to the axis of the first body 22, and a gear 78 is provided on the other end of each shaft 76. The gear 78 meshes with the corresponding one of the racks 62. Therefore, when the servo motor 68 is rotated, the cutter 20 is vertically shifted through the rotation of the servo motor 68.

A motor 80 is mounted on the bracket 60. The rotation of the motor 80 is transmitted from a bevel gear 82 mounted on the rotary shaft of the motor 80 to a bevel gear 84 rotatably supported by the bracket 60 so as to mesh with the gear 82. The rotary shaft 66 extends slidably and unrotatably through the bevel gear 84. As a result, when the motor 80 is rotated, the cutter 20 is rotated about the axis of the first body 22 extending in the radial direction thereof. Preferably, use is made of a reversible motor for the motor 80.

The first and second bodies 22,24 are respectively provided with a plurality of maintaining mechanisms 86,88 for releasably maintaining the positions of the bodies 22,24 relative to the first pipe 12. Each of the maintaining mechanisms 86,88 is provided with an actuator capable of projecting outward from the corresponding one of the bodies 22,24 in the radial direction thereof. The respective actuators, when protruded from the bodies 22,24, are brought into frictional engagement with the inner surface of the first pipe 12 to maintain the bodies 22,24 in their positions to be immovable relative to the first pipe 12. As for the maintaining mechanism as noted above, use is made of a solenoid mechanism or a cylinder mechanism.

The cutter 20 is provided with a plurality of blades. Each of the blades draws a locus of rotation composed of a flat upper surface, a conical surface following the upper surface and a tubular surface following the conical surface and is disposed so that the diameter of the locus of rotation comes to be smaller than the inner diameter of the second pipe 18.

The rotary shaft 66 extends through a bellows 90 provided on the bracket 60 to maintain liquid tightness between the cutter 20 and the bracket 60.

Further, each of the servo motors 40,54,68 is provided with an encoder for generating an electric signal every time each servo motor is rotated by a predetermined angle.

Figure 4:
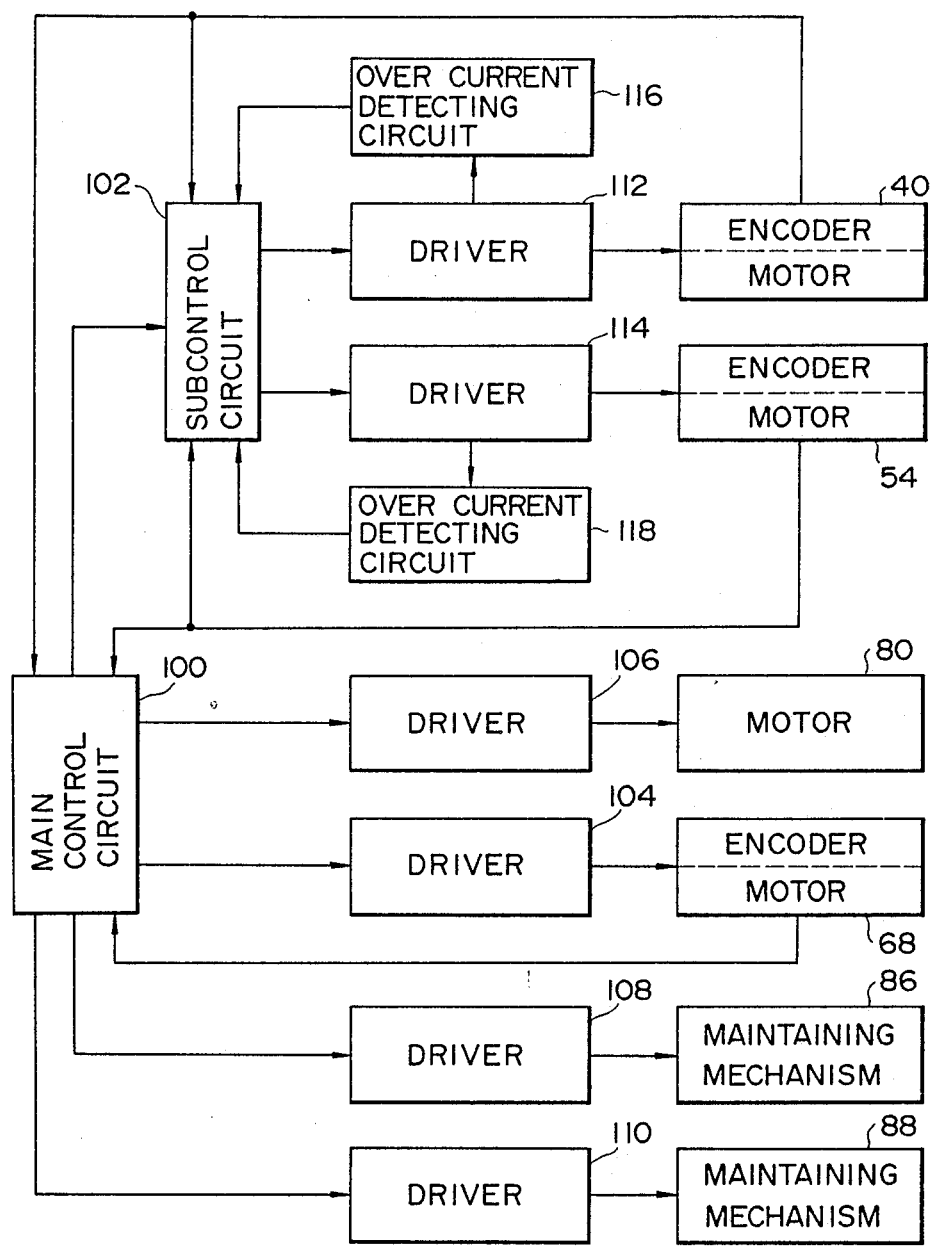
FIG. 4 is a block diagram showing an embodiment of an electric circuit.

An electric circuit for operating the boring apparatus 10, as shown in FIG. 4, comprises a main control circuit 100 and a subcontrol circuit 102. The main control circuit 100 controls the subcontrol circuit 102 while it controls a driver 104 for the use of servo the motor 68, a driver 106 for use of the motor 80, a driver 108 for the use of maintaining mechanism 86 and a driver 110 for the use of maintaining mechanism 88. On the other hand, the subcontrol circuit 102 controls a driver 112 for the use of servo motor 40 and a driver 114 for the use of the servo motor 54 by control signals received from the main control circuit 100 so that the cutter 20 is shifted in the direction of the axis parallel to the first pipe 12 while it is angularly rotated about the aforementioned axis.

Further, the subcontrol circuit 102 preferably corresponds to a numerical control circuit which is so constituted to control the drivers 112,114 in accordance with a previously stored program. However, other circuits may be available for the subcontrol circuit. Also, the functions of the main control circuit 100 and subcontrol circuit 102 may be executed by the use of a single computer.

To the drivers 112,114 are respectively connected overcurrent detecting circuits 116,118 for detecting a state in which overcurrent is acted on the servo motors 40,54. The detecting signal provided from each of the overcurrent detecting circuits is fed to the subcontrol circuit 102.

The output signal provided from the encoder of the servo motor 68 is fed to the main control circuit 100 while the output signal provided from each of the encoders of the servo motors 40,54 is fed to both main control circuit 100 and subcontrol circuit 102.

Prior to the boring operation, the boring apparatus 10 is first disposed from a vertical shaft communicating to the first pipe 12 into the first pipe 12 and then is shifted to a position where the cutter 20 confronts the pipe opening of the second pipe 18.

In order to shift the boring apparatus 10 to a predetermined position, a distance between the vertical shaft and the pipe opening of the second pipe 18 may be measured prior to installation of the pipe 14 to thereby shift the apparatus 10 over the measured distance by means of a rope or the like, for example.

The boring apparatus 10, however, propels itself to the predetermined position by controlling the drivers 108,110,114 with the main control circuit 100 and subcontrol circuit 102 so that the maintaining mechanisms 86,88 are alternatively operated after the measured distance is set in the main control circuit 100 and the servo motor 54 is then rotated forward when the maintaining mechanism 86 is operated while the servo motor 54 is then rotated backward when the maintaining mechanism 86 is operated.

Namely, when the maintaining mechanism 86 is operated and the servo motor 54 is then rotated forward, the second body 24 advances relative to the first body 22 under the condition that the first body 22 is maintained immovable relative to the first pipe 12. On the other hand, when the maintaining mechanism 88 is operated and the servo motor 54 is then rotated backward, the first body 22 is attracted toward the second body 24 under the condition that the second body 24 is maintained immovable relative to the first pipe 12. Thus, the boring apparatus 10 is shifted to the predetermined position by repeatedly performing the above processes.

The distance by which the boring apparatus 10 is shifted may be measured by counting the number of output signals provided from the encoder of the servo motor 54 in the main control circuit 100 when the servo motor 54 is rotated forward.

Further, when a position corresponding to the pipe opening of the second pipe 18 may be confirmed from the interior of the first pipe 12, the boring apparatus 10 may be determined in position through remote control so that the cutter 20 is disposed in the center of the pipe opening of the second pipe 18. This remote control operation may be carried out by using a television camera and a monitor for receiving an output signal from the television camera to operate the servo motors 40,54 while monitoring the monitor.

When the boring apparatus 10 is shifted to the predetermined position, the main control circuit 100 controls the drivers 108,110 so that the maintaining mechanism 86 is operated whereas the maintaining mechanism 88 is not operated. By so doing, the first body 22 is maintained in position to be immovable position relative to the first pipe 12.

When the boring operation is done, the main control circuit 100 controls the drivers 104,106 so as to operate the motors 80,68 at the same time. Accordingly, the cutter 20 is rotated about the axis extending in the radial direction of the first pipe 12 while it ascends along the aforementioned axis to a position in which the upper portion of the cutter 20 projects from the pipe 16, so that a hole is bored in a portion of the first pipe 12 which closes the pipe opening of the second pipe 18.

Next, the main control circuit 100 outputs an instruction to rotate forward and backward the motors 40,54 to the subcontrol circuit 102 at least once, preferably over and over under the condition that the cutter 20 is maintained at a predetermined height and the maintaining mechanism 86 is operated. Consequently, the subcontrol circuit 102 controls the drivers 112,114 in accordance with a program stored in the subcontrol circuit. As a result, the hole noted above is expanded since the cutter 20 is reciprocated at least once in the direction of the axis extending in parallel to the first pipe 12 and in the circumferential direction of the first pipe 12 respectively.

When the motors 40,54 are repetitively rotated forward and backward, it is preferable to gradually increase the angular displacement of the cutter 20 around the axis in parallel to the first pipe 12 and the displacement of the cutter 20 in the axial direction of the first pipe 12. By so doing, the hole noted above may be gradually expanded. Also, if the motors 40,54 are rotated so that the maximum displacement of the cutter 20 in the direction of the axis parallel to the first pipe 12 comes to be equal with the maximum displacement of the first pipe 12 in the circumferential direction of the first pipe 12, that is, the displacement of the cutter around the aforementioned axis, the locus of motion of the cutter 20 results in a circle. On the other hand, if the motors 40,54 are rotated to make both of maximum displacements different from each other, the locus of motion of the cutter 20 results in an ellipse. Further, by adjusting the timing in which the displacement of the cutter in the direction of the axis parallel to the first pipe 12 comes to the maximum value and the timing in which the displacement around the aforementioned axis comes to the maximum value, it is possible to adjust the direction of a longer axis of the ellipse.

During the boring operation, when the upper portion of the cutter 20 is brought into contact with the inner surface of the second pipe 18, the cutter 20 will cut away portions of the first and second pipe 12,18, so that a load which is larger than that acting on the cutter 20 when cutting away only the portion of first pipe 12 acts on the cutter 20 to hinder the rotation of the cutter 20. At this time, since overcurrent flows into the motors 40,54, the flow of overcurrent into the motors is detected by the overcurrent detecting circuits 116,118 which then feed the detecting signals to the subcontrol circuit 102.

Thus, the subcontrol circuit 102 controls the drivers 112,114 so as to prevent any overload from acting on the cutter 20, that is, to prevent the portion of the second pipe 18 from being cut away, and to correct the position of the cutter 20 relative to the first pipe 12, and hence direction of movement of the cutter 20. As a result, since the upper portion of the cutter 20 is shifted along the inner surface of the second pipe 18, a predetermined hole in size may be bored in a predetermined position without largely cutting away the portion of second pipe 18 even if the positional relationship between the rotary axis of the cutter 20 and the center of the portion to be bored a hole is inaccurate.

During the process of the boring operation, the portion to be bored a hole may be monitored by a television camera and a monitor.

Further, whether or not the cutter 20 is shifted to the position to be cut away from the portion of the second pipe 18 may be judged by connecting an overcurrent detecting circuit of the same kind as the overcurrent detecting circuits 116,118 to the driver 106 to feed the detecting signal of the overcurrent detecting circuit to the subcontrol circuit 102. Also, whether or not the cutter 20 is shifted to the position to be cut away from the portion of the second pipe 18 may be judged in the main control circuit 100 or subcontrol circuit 102 on the basis of the output signal from the overcurrent detecting circuit by connecting a usual current detecting circuit, instead of the overcurrent detecting circuit to the drivers 106,112 or 114.

Further, by angularly rotating the cutter 20 about the first axis extending in the axial direction of the first pipe 12, the cutter 20 may be shifted along the second axis, instead of displacing the cutter 20 in parallel to the second axis orthogonal to the first axis extending in the axial direction of the first pipe 12 and the rotary axis of the cutter 20.

What is claimed is:

1. An apparatus for boring a hole in a first member to which a second member is attached, comprising:
    cutting means having a rotary axis extending in the direction intersecting a portion to be bored of said first member and a cutting profile smaller than said hole;
    first drive means for displacing said cutting means in the direction of an imaginary first line intersecting said rotary axis;
    second drive means for displacing said cutting means in the direction of an imaginary second line intersecting both said rotary axis and said first line;
    third drive means for rotating said cutting means about said rotary axis;
    detecting means for detecting a load acting on said cutting means and generating an output signal based thereon; and
    control means for controlling said first and second drive means on the basis of said output signal of said detecting means for correcting the position of said cutting means relative to a portion to be bored;
    wherein at least one of said first, second and third drive means is provided with a rotary source consisting of an electric motor;
    wherein said detecting means detects the load acting on said cutting means on the basis of the power supplied to said electric motor; and
    wherein said control means controls, on the basis of said output signal, said first and second drive means so as to displace the position of said cutting means in the directions along said first and second lines to a position where no large load acts on said cutting means.

2. An apparatus according to claim 1, further comprising fourth drive means for displacing said cutting means in the direction of said rotary axis.

3. An apparatus according to claim 1, wherein said second member is attached to one side of said first member and defines a space which will communicate with said first member through said hole; and
    wherein said control means is provided with a numerical control circuit for controlling said first and second drive means on the basis of said output signal so that said cutting means may be shifted along the inner surface of said second member.

4. An apparatus according to claim 3, wherein said hole is bored from the other side of said first member.

5. An apparatus according to claim 4, wherein said first and second members are respectively cylindrical members; and
    wherein said second member is disposed on the outer peripheral surface of said first member so as to extend in the direction intersecting the axis of the first member.

6. An apparatus according to claim 5, wherein said rotary axis is a straight line extending in the radial direction of said first member;
    wherein said first line is a straight line extending in the axial direction of said first member; and
    wherein said second line is a curved line extending around said first line.

7. An apparatus according to claim 4, wherein said first member is a first pipe embedded in the ground;

wherein said second member is a second pipe connected to said first pipe so as to be branched from said first pipe;

wherein said rotary axis is a straight line extending in the radial direction of said first pipe;

wherein said first line is a straight line extending in the axial direction of said first pipe; and wherein said second line is a curved line extending around said first line.

8. An apparatus according to claim 7, wherein said second drive means is means for rotating said cutting means about said first axis.

9. An apparatus according to claim 8, further comprising:

a first body for supporting said first and second drive means; and a second body supported by the first body so as to be shiftable in the direction of said first axis and rotatable about said first axis, said second body supporting said third drive means and cutting means;

wherein each of said first and second bodies is provided with means protruding from the body in the direction of said rotary axis to releasably maintain the position of said body relative to said first pipe.

10. An apparatus according to claim 9 further comprising a fourth drive means supported by said second body so as to displace said cutting means in the direction of said rotary axis.

11. An apparatus according to claim 10, wherein said control means is provided with a subcontrol circuit for controlling said first and second drive means on the basis of said output signal, so that said cutting means may be shifted along the inner surface of said second pipe and a main control circuit for controlling said subcontrol circuit, said third device means and said maintaining means.

12. An apparatus according to claim 4, wherein said first member is a flat plate; and wherein said second member is disposed on the side of one surface of said first member.

13. An apparatus according to claim 12, wherein said second member extends in the direction intersecting said one surface of said first member.

14. An apparatus according to claim 1, wherein each of said first and second drive means is provided with said rotary source consisting of said electric motor; and wherein said detecting means has circuits corresponding to respective electric motors, said circuits detecting said load acting on said cutting means on the basis of power supplied to said electric motor corresponded.

15. An apparatus according to claim 14, wherein each of said circuit detects that said large load has acted on said electric motor, on the basis of said power supplied to said electric motor.

16. An apparatus according to claim 1, wherein said detecting means has circuits for detecting that said large load has acted on said electric motor, on the basis of said power supplied to said electric motor.

17. An apparatus for boring a hole in a first pipe to which a second pipe is connected so as to branch from said first pipe and to define a space closed by said first pipe, said hole being bored form the inner portion of said first pipe, so that said space may be opened to the inner space of said first pipe, comprising:

cutting means having a rotary axis extending in the direction intersecting the bored portion of said first pipe and a cutting profile smaller than said hole;

first drive means for displacing said cutting means in the direction of an imaginary first line intersecting said rotary axis;

second drive means for displacing said cutting means in the direction of an imaginary second line intersecting both said rotary axis and said first line;

third drive means for rotating said cutting means about said rotary axis;

detecting means for detecting a load action on said cutting means and generating an output signal based thereon; and control means for correcting the position of said cutting means relative to the bored portion by controlling said first and second drive means on the basis of said output signal of said detecting means;

wherein at least one of said first, second and third drive means is provided with a rotary source consisting of an electric motor;

wherein said detecting means detects, on the basis of the power supplied to said electric motor, that a large load has acted on said electric motor; and wherein said control means controls said first and second drive means on the basis of said output signal of said detecting means when a large load has acted on said electric motor so as to displace the position of said cutting means in the direction along said first and second lines to a position where no large load acts on said cutting means.

18. An apparatus for boring a hole in a first member to which a tubular second member having a space is attached, said first member having one surface and another surface on the opposite side thereto, said second member being disposed on the side of said another surface so that said space is closed by said first member, said hole being bored from the side of said one surface, so that said space is opened to the side of said one surface of said first member, comprising:

cutting means having a rotary axis extending in the direction intersecting the bored portion of said first member and a cutting profile smaller than said hole;

first drive means for displacing the cutting means in the direction of an imaginary second line intersecting said rotary axis;

second drive means for displacing said cutting means in the direction of an imaginary second line intersecting both said rotary axis and said first line;

third drive means for rotating said cutting means about said rotary axis;

detecting means for detecting a load acting on said cutting means and generating an output signal based thereon; and control means for correcting the position of said cutting means relative to the bored portion by controlling said first and second drive means, on the basis of said output signal of said detecting means;

wherein at least one of said first, second and third drive means is provided with a rotary source consisting of an electric motor;

wherein said detecting means detects, on the basis of the power supplied to said electric motor, that a large load has acted on said electric motor; and wherein said control means controls said first and second drive means on the basis of said output signal of said detecting means when a large load has acted on said electric motor so as to displace the position of said cutting means in the direction along said first and second lines to a position where no large load acts on said electric motor.

19. An apparatus for boring a hole in a plate-like first member to which a second member having a space is attached, said second member being disposed on one surface of said first member so that said space is closed by said first member, said hole being bored from the side of the other surface of said first member so that said space may be opened to the side of said other surface of said first member, comprising:

cutting means having a rotary axis extending in the direction intersecting the bored portion of said first member and a cutting profile smaller than said hole;

first drive means for displacing said cutting means in the direction of an imaginary first line intersecting said rotary axis;

second drive means for displacing said cutting means in the direction of an imaginary second line intersecting both said rotary axis and said first line;

third drive means for rotating said cutting means about said rotary axis;

detecting means for detecting a load acting on said cutting means and generating an output signal based thereon; and control means for correcting the position of said cutting means relative to the bored portion by controlling said first and second drive means on the basis of said output signal of said detecting means;

wherein at least one of said first, second and third drive means is provided with a rotary source consisting of an electric motor;

wherein said detecting means detects, on the basis of the power supplied to said electric motor, that an overload has acted on said electric motor; and wherein said control means controls said first and second drive means on that basis of said output signal of said detecting means when a large load has acted on said electric motor, so as to displace the position of said cutting means in the direction along said first and second lines to a position where no large load acts on the cutting means.

* * * * *